United States Patent
Ahmed et al.

(10) Patent No.: US 10,552,405 B2
(45) Date of Patent: *Feb. 4, 2020

(54) DRIFT DETECTION AND NOTIFICATION

(71) Applicant: MICROSOFT TECHNOLOGY LICENSING, LLC, Redmond, WA (US)

(72) Inventors: Haroon Ahmed, Bellevue, WA (US); James D. Laflen, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 284 days.

This patent is subject to a terminal disclaimer.

(21) Appl. No.: 15/634,829

(22) Filed: Jun. 27, 2017

(65) Prior Publication Data

US 2017/0300523 A1    Oct. 19, 2017

Related U.S. Application Data (63) Continuation of application No. 13/552,239, filed on Jul. 18, 2012, now Pat. No. 9,697,238.

(60) Provisional application No. 61/605,706, filed on Mar. 1, 2012.

(51) Int. Cl.
*G06F 16/23* (2019.01)
*G06F 16/21* (2019.01)
*G06F 16/25* (2019.01)

(52) U.S. Cl.
CPC .......... *G06F 16/2358* (2019.01); *G06F 16/21* (2019.01); *G06F 16/2379* (2019.01); *G06F 16/252* (2019.01)

(58) Field of Classification Search
CPC .. G06F 16/2358; G06F 16/21; G06F 16/2379; G06F 16/2365; G06F 16/252; G06F 11/004
See application file for complete search history.

(56) References Cited

U.S. PATENT DOCUMENTS

| | | | |
|---|---|---|---|
| 4,642,758 A * | 2/1987 | Teng | H04L 67/06 |
| 5,680,610 A | 10/1997 | Smith et al. | |
| 5,721,909 A | 2/1998 | Oulid-Aissa et al. | |
| 5,826,253 A | 10/1998 | Bredenberg | |
| 5,933,604 A | 8/1999 | Inakoshi | |
| 5,990,810 A | 11/1999 | Williams | |
| 6,366,933 B1 * | 4/2002 | Ball | G06F 16/957 715/203 |

(Continued)

FOREIGN PATENT DOCUMENTS

KR    20190009202 A  *  1/2019

OTHER PUBLICATIONS

"HP-UX Reference Release 11.0", In Hewlett-Packard Company, vol. 3, Section 2-191, Oct. 1, 1997, 2 Pages.

(Continued)

*Primary Examiner* — Jason G Liao
(74) *Attorney, Agent, or Firm* — Workman Nydegger (57) ABSTRACT

A drift condition, or change, in a data structure can be detected and communicated to one or more subscribers. Data structure can be monitored by periodic configurable polling of a data source or on demand polling. Upon detection of a change in the in the data structure, subscribers can be notified of the change and optionally other information such as the identity of the object that changed and nature of the change.

14 Claims, 6 Drawing Sheets

(56) References Cited

U.S. PATENT DOCUMENTS

| | | | |
|---|---|---|---|
| 6,910,070 | B1 | 6/2005 | Mishra et al. |
| 7,162,472 | B2 | 1/2007 | Galindo-Legaria et al. |
| 7,464,068 | B2 | 12/2008 | Fan et al. |
| 8,910,070 | B2 | 12/2014 | Goodger et al. |
| 9,697,238 | B2 | 7/2017 | Ahmed et al. |
| 2002/0156897 | A1 | 10/2002 | Chintalapati et al. |
| 2003/0014491 | A1* | 1/2003 | Horvitz ............... G06Q 10/109 709/206 |
| 2003/0172368 | A1 | 9/2003 | Alumbaugh et al. |
| 2004/0214550 | A1 | 10/2004 | Jenkins |
| 2005/0049994 | A1 | 3/2005 | Thompson et al. |
| 2007/0273558 | A1* | 11/2007 | Smith ................. G08G 1/0962 340/995.1 |
| 2010/0185596 | A1 | 7/2010 | Dee |
| 2010/0198871 | A1* | 8/2010 | Stiegler ................ H04L 67/104 707/783 |
| 2012/0036497 | A1 | 2/2012 | Karthik et al. |
| 2013/0080348 | A1 | 3/2013 | Pantaliano et al. |
| 2013/0080349 | A1 | 3/2013 | Bhola et al. |
| 2014/0222497 | A1* | 8/2014 | Cantor ............... G06Q 10/0633 705/7.28 |
| 2016/0117471 | A1* | 4/2016 | Belt .................... G06F 19/3456 705/2 |
| 2017/0068736 | A1* | 3/2017 | Beckley ............. G06F 16/9535 |
| 2018/0095938 | A1* | 4/2018 | Monte ................. G06F 3/0488 |
| 2018/0285960 | A1* | 10/2018 | Li ...................... G06Q 30/0635 |

OTHER PUBLICATIONS

"Non-Final Office Action Issued in U.S. Appl. No. 15/411,874", dated Jun. 11, 2018, 23 Pages.

Office Action dated Aug. 8, 2017 cited in U.S. Appl. No. 15/411,874 (Copy Attached).

Office Action dated Dec. 19, 2017 cited in U.S. Appl. No. 15/411,874 (Copy Attached).

"Non Final Office Action Issued in U.S. Appl. No. 15/411,874", dated Mar. 15, 2019, 17 Pages.

"Final Office Action Issued in U.S. Appl. No. 15/411,874", dated Jun. 12, 2019, 19 Pages.

"Dell Latitude D600", Retrieved from<<https://web.archive.org/web/20090807001313/http://www.dell.com/downloads/global/products/latit/en/spec_latit_d600_en.pdf», Retrieved Date: Aug. 7, 2009, 2 Pages.

"OPCODES for 16-bit RISC Microprocessor", Retrieved from<<http://ece-research.unm.edu/jimp/vlsill/project/risc16/op_codes.pdf>>, Jan. 2001, 3 Pages.

"Resiliency Patterns and Guidance", Retrieved from<<https://web.archive.org/web/20140304083102/http:/msdn.microsoft.com/en-us/library/dn600215.aspx>>, Mar. 4, 2014, 3 Pages.

"SQL Tutorial", Retrieved from <<http:/ www.firstsql.com/tutor6.htm>>, Jan. 2005, 13 Pages.

"Ted Codd and his Rules for Relational Databases", Retrieved from<<http://www.databaseanswers.org/codds_rules.htm>>, Jan. 2001, 2 Pages.

"The Reactive Manifesto", Retrieved from <<http://www.reactivemanifesto.org/>>, Sep. 16, 2014, 2 Pages.

"Final Office Action Issued in U.S. Appl. No. 13/552,239", dated Jun. 13, 2014, 13 Pages.

"Final Office Action Issued in U.S. Appl. No. 13/552,239", dated Aug. 6, 2015, 24 Pages.

"Final Office Action Issued in U.S. Appl. No. 13/552,239", dated Aug. 3, 2016, 25 Pages.

"Non-Final Office Action Issued in U.S. Appl. No. 13/552,239", dated Oct. 26, 2016, 8 Pages.

"Non-Final Office Action Issued in U.S. Appl. No. 13/552,239", dated Apr. 13, 2016, 17 Pages.

"Non-Final Office Action Issued in U.S. Appl. No. 13/552,239", dated Jan. 12, 2015, 20 Pages.

"Non-Final Office Action Issued in U.S. Appl. No. 13/552,239", dated Dec. 4, 2013, 13 Pages.

"Notice of Allowance Issued in U.S. Appl. No. 13/552,239", dated Mar. 15, 2017, 7 Pages.

Atwood, Jeff, "Understanding Model-View-Controller", Retrieved from <<https:/ blog.codinghorror.com/understanding-model-view-controller/>>, May 5, 2008, 7 Pages.

Christensen, Ben, "Application Resilience in a Service-oriented Architecture", Retrieved from<<http:/ radar.oreilly.com/2013/06/application-resilience-in-a-service-oriented-architecture.html>>, Jun. 10, 2013, 1 Page.

Munroe, "Real Programmers", Retrieved from <<https:/web.archive.org/web/20150722093651/http://xkcd.com/378>>, Retrieved Date: Jul. 21, 2015, 2 Pages.

Reagle, Joseph, "Agent: I don't think it means, what you think it means", Retrieved from<<https://cyber.harvard.edu/archived_content/people/reagle/agents-19990524.html>>, May 24, 1999, 17 Pages.

Reddy, Surendra, "Continuous Application Availability: Strategy for Business Resiliency", Retrieved from<<http://www.drj.com/articles/online-exclusive/continuous-application-availability-strategy-for-business-resiliency.html>>, Feb. 23, 2011, 5 Pages.

Reenskaug, Trygve, "Models-Views-Controllers", Retrieved from<<http://heim.ifi.uio.no/~trygver/1979/mvc-2/1979-12-MVC.pdf>>, Dec. 10, 1979, 2 Pages.

Sanda, John, "Drift Management", Retrieved from <<https://web.archive.org/web/20111104171425/http:/rhq-project.org/display/RHQ/Drift+Management>>, Nov. 14, 2011, 11 Pages.

Schach, Stephen R., "Chapter 3—Software Life-cycle Models", In Book—Classical and Object-oriented Software Engineering with UML and Java, 4th Edition, WCB/McGraw-Hill, Jan. 1999, 15 Pages.

"Final Office Action Issued in U.S. Appl. No. 15/411,874", dated Sep. 18, 2018, 18 Pages.

"Catalog Footprint", Retrieved from https://scholar.google.com/scholar?hl=en&as_sdt=0%2C5&q=%22catalog+footprint%22, Retrieved on Sep. 13, 2018, 2 Pages.

"Catalog Footprint", Retrieved from https://www.google.com/search?q=%22catalog+footprint...&spell=1&sa=X&ved=0ahUKEwi_6M6g2djeAhVKRo8KHUZXBL8QBQgoKAA&biw=1440&bih=758, Sep. 12, 2018, 2 Pages.

Berthold, Reinwald, "Multitenancy", Retrieved from https://www.cs.washington.edu/mssi/2010/BertholdReinwald.pdf, Jan. 2010, 11 Pages.

* cited by examiner

DRIFT DETECTION AND NOTIFICATION

CROSS-REFERENCE TO RELATED APPLICATIONS

This application is a continuation of U.S. patent application Ser. No. 13/552,239 filed on Jul. 18, 2012, entitled "DRIFT DETECTION AND NOTIFICATION," which issued as U.S. Pat. No. 9,697,238 on Jul. 4, 2017, which claims the benefit of and priority to U.S. Provisional Patent Application Ser. No. 61/605,706 filed on Mar. 1, 2012, and entitled "DRIFT DETECTION AND NOTIFICATION."

This application is also related to U.S. patent application Ser. No. 15/411,874, filed on Jan. 20, 2017, entitled "DRIFT DETECTION AND NOTIFICATION," which is a continuation of U.S. patent application Ser. No. 13/552,239, filed on Jul. 18, 2012, entitled "DRIFT DETECTION AND NOTIFICATION," which issued as U.S. Pat. No. 9,697,238 on Jul. 4, 2017, which claims the benefit of and priority to U.S. Provisional Patent Application Ser. No. 61/605,706, filed on Mar. 1, 2012, and entitled "DRIFT DETECTION AND NOTIFICATION." All of the foregoing applications are expressly incorporated herein by reference in their entireties.

BACKGROUND

Data structure refers to a particular manner of organizing and storing data. In other words, data is structured in accordance with a particular data model or schema. In a database, for instance, a database definition (a.k.a. database model) specifies structure in terms of metadata that defines database objects. In relational database management system (RDBMS), for example, the metadata includes tables, views, functions, procedures, and other system objects. The metadata can also include reference data (e.g., zip codes, states, countries . . . ) that is stored in tables but is logically part of the definition. A database definition can be stored in various source and operational formats and deployed as a live database on a running database server, for instance.

A variety of applications exists that exploit the database definition to provide various tools or services including deployment, upgrade, comparison, navigation, and validation, among others. By way of example, tools exist that provide a visualization of the structure of a database.

BRIEF SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to a drift detection and notification. Structure associated with a data source can be automatically monitored by polling a data source periodically at configurable intervals. If a drift condition, or change, pertaining to data source structure, is detected (e.g., table or column of table added, deleted or modified), one or more subscribers can be notified. In accordance with one aspect of the disclosure, occurrence of a drift condition can be detected and communicated to subscribers. Additional information can optionally be acquired and provided to subscribers such as the identity of a particular structure or object that changed and the nature of the change as a function of each subscriber's subscription.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

In most environments, a data source, such as a database, is a shared commodity that can be accessed simultaneously by multiple entities, or clients. Moreover, any client with sufficient access rights can modify the structure of the data source. For example, a column in a table could be deleted or a column name could be changed, among other things. In other words, a drift condition occurs since the data structure has drifted away from its previous state. Changes made by one client are invisible but affecting to other clients, since database management systems (DBMSs) either do not maintain a connection with clients or do not extend notifications to connected clients. This is motivated at least in part to optimize performance and scalability of database systems. As a result, a failure can occur anytime based on differences between expected and actual data structure. This may require recompilation, reconfiguration, and/or redeployment of non-resilient client applications. Resilient applications can survive changes without recompilation and redeployment. Nevertheless, resilient applications can still be adversely affected by changes.

One solution to the above noted issues is for client applications to inject specialized code, like database triggers, into a target source and log changes. Alternatively, database environments can be configured to enable use of built-in logging measures. Still further yet, users can be required to perform refreshes explicitly to resynchronize the internal state of a client application with the current data structure. Injecting specialized code or employing built-in logging, however, imposes requirements on a target data source that affects operational characteristics of the data source and consequently overall solutions. For instance, such mechanism can adversely slow down all solution applications working over the same target data source. Furthermore, for a class of client applications and environments, such practices are not even allowed because of enterprise policies or constraints. Client applications that support explicit refresh avoid the aforementioned problems, but do so at the expense of downgraded user experience. For example, a user of a client application does not know when the underlying state of a data source has changed and when to invoke the explicit refresh.

Details below are generally directed toward drift detection and notification. Such functionality can be performed automatically, so as not to compromise client user experience, as well as external to and without obligations, or requirements, on a database management system, for example, to track the state of data structure. Data structure can be monitored and drift, or changes, detected, for example by polling a data source for current state information and comparing it with previous state information. Upon detection of a change, a subscribed client can be notified that a change has occurred. Optionally, additional information can be acquired from a data source and communicated to a subscribed client such as the name and type of object that was changed as well as the nature of the change (e.g., modification, addition, removal, renames . . . ). This is lightweight as polling and data retention can be limited to that required to detect a drift. Further, there need not be any special support from a target data-source management system, apart from security permissions to access data-structure information. Additionally, capabilities of a data source, database management system, or database server can be exploited to optimize drift detection and notification.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
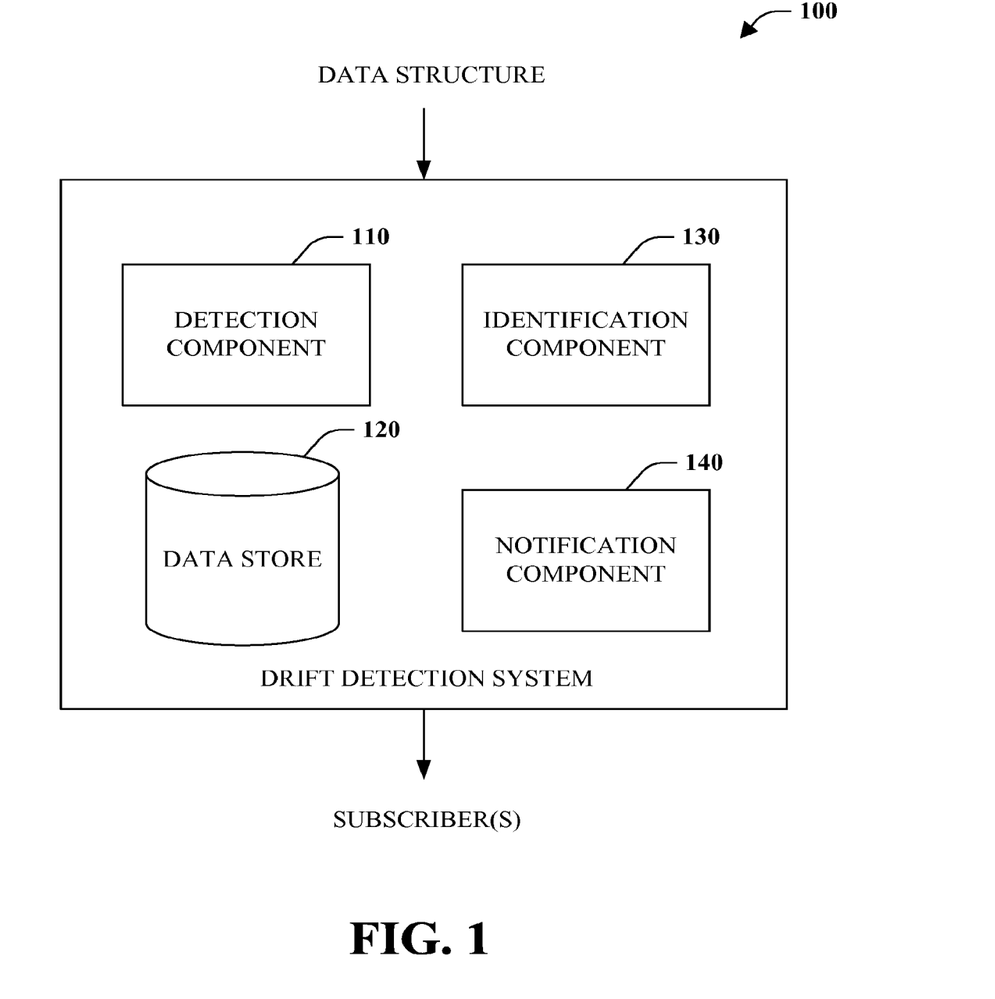
FIG. 1 is a block diagram of a drift detection system.

Referring initially to FIG. 1, a drift detection system 100 is illustrated. The drift detection system 100 can be a subscription-based system that monitors structure of a data source, such as but not limited to a database, and provides notifications to subscribers regarding drift, or changes, to the data structure. The subscribers can be, but are not limited to being, client applications that operate over a data source. In furtherance of the above functionality, the drift detection system 100 includes detection component 110, data store 120, identification component 130, and notification component 140.

The detection component 110 is configured to detect the presence of a drift condition. Here, a drift condition means any change in data structure. Data structure can include a number of objects such as tables, views, and stored procedures (text objects), among other things, and can be hierarchical in nature. A change in data structure can include adding a new object, removing an existing object, or renaming an existing object, among other mutations. For example, if a table has two columns at time "T0" and at time "T1" a new column is added, a drift condition can be said to exist because the structure has drifted from its previous state. Similarly, a drift condition can occur when a table is added or removed. Furthermore, the detection component 110 can be configured to detect a drift condition with respect to anything that can be used as, or is analogous to, structure such as reference data. For example, a change in the content of a table including zip codes can be considered a drift condition.

The detection component 110 can periodically check for the presence of drift by polling a data source (or more specifically a management system associated with the data source) at configurable intervals (e.g., 1 minute, 5 minutes, 10 minutes . . . ) or on-demand in response to a request by a subscriber (e.g., between intervals, as needed). As a result, drift detection can be said to be lightweight since it does not adversely impact the performance or scalability of a data source or data-source management system. More specifically, a data source or related functionality need not be burdened with tracking and maintaining state.

Figure 2:
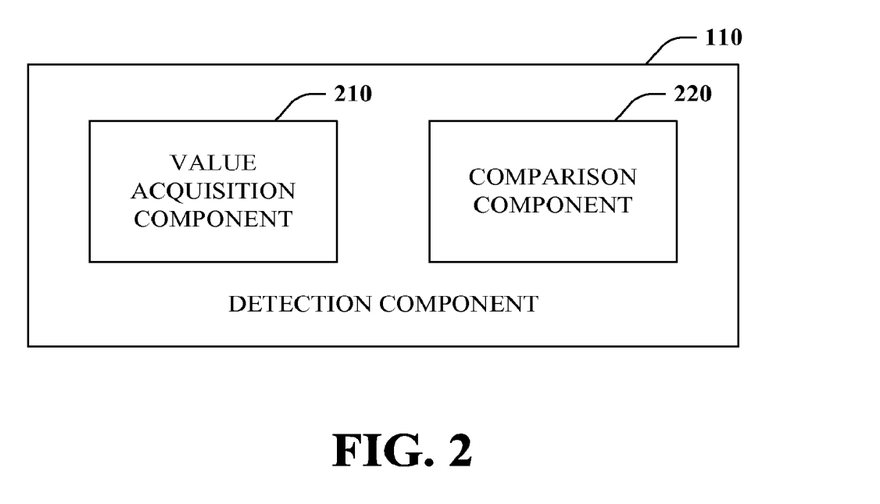
FIG. 2 is a block diagram of a representative detection component.

Many different mechanisms can be employed by the detection component 110 to detect a drift condition, or change, with respect to data structure. Turning attention to FIG. 2, a representative detection component 110 is depicted in detail. Value acquisition component 210 is configured to acquire a value indicative of the state of data structure. In accordance with one embodiment, a checksum (a.k.a. hash sum) algorithm (e.g., CRC, MD5 . . . ) can be utilized. More specifically, given an object (e.g., table, view . . . ) with a particular data structure, a predictable and repeatable number is returned reflective of the data structure. If a target data store includes a checksum associated with objects in a system catalog, of instance, the checksum can simply be acquired. Alternatively, a checksum can be computed by the value acquisition component 210. Moreover, the value need not be a checksum. In another embodiment, the value acquisition component 210 can acquire timestamps associated with data source objects. Accordingly, a timestamp associated with data structure can be acquired indicating the last time the data structure was modified. Generally, the value acquisition component 210 can exploit any information provided by a data management system indicative of the state of a data structure.

Comparison component 220 is configured to compare values obtained by the value acquisition component 210 from different times. More specifically, a previously acquired value, saved in data store 120, for example, can be compared with a currently acquired valued. If the values differ, a drift condition, or change, has been detected. For example, if the checksum computed at time "T0" is different from the checksum computed at time "T1," a drift condition has been detected. Similarly, a drift condition can be detected if the time stamp associated with one or more data structures differs from that which was previously recorded. If a drift condition has been detected, the currently computed or acquired value can be saved, for example to data store 120, for subsequent comparisons.

Returning to FIG. 1, the data store 120 can be utilized to store or save data utilized to enable drift detection and notification. As previously mentioned, the data store 120 can house values like checksums or timestamp to enable subsequent comparison and detection of drift. Among other things, the data store 120 can also store the name and type of objects. For example, if the object is a table with three columns, the data store 120 can house a table "T1" with a column "C1" of type integer, a column "C2" of type string. Such information can be useful in determining additional information concerning a drift.

The identification component 130 is configured to identify information concerning a drift condition. If a drift condition occurs, it is detectable with respect to a specific object. For example, the checksums associated with a specific table may not match. However, checksum values are very lightweight and do not communicate any meaningful information outside the drift detection system 100. The identification component 130 can determine more specific information regarding the drift condition.

Figure 3:
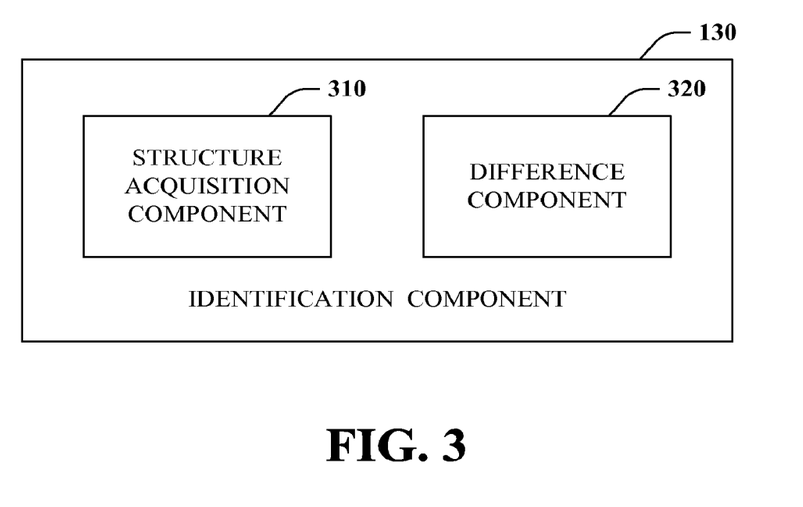
FIG. 3 is a block diagram of a representative identification component.

FIG. 3 illustrates a representative identification component 130. Structure acquisition component 310 is configured to query a data source, or more specifically a data-source management system for the name and type of object for which a drift condition was detected, for example. Additionally, the structure acquisition component 310 can be configured to acquire previously saved information about a structure such as the name and type of object. The difference component 320 is configured to compare current and previous structures and identify one or more differences between the structures. Accordingly, the nature of a change or changes to a data structure can be revealed. In one instance, the difference component can identify differences as a function of object names and types. By way of example, for a table where the checksums did not match, column names and types can be requested and returned. This information acquired at time "T1" can then be compared with that which was returned at time "T0." Such a comparison can reveal a new column that was added or that a column that used to be there was deleted, for example. This is a very lightweight and expeditious approach. Of course, other solutions are also contemplated including acquiring a data structure and identifying the differences between a currently acquired data structure and a saved, previously acquired data structure.

Returning to FIG. 1, the notification component 140 is configured to notify subscribers of drift conditions, or changes to structure. Here, subscribers can be applications or components of an application interested in learning the state of a data source. In accordance with one embodiment, subscribers can subscribe to different levels of detail. Consider a non-resilient client application that cannot cope with changes. In this case, maybe the subscriber is simply notified that a change was detected. Another high privilege subscriber may be interested in more detail. Here, a specific data source object that changed can be identified. For example, the notification can indicated that table "T1" was changed. At yet another level of granularity, the object and nature, or kind, of changes can be communicated. For instance, column "C1" was deleted from table "T1." In other words, the granularity of information communicated can be adjusted based on interest as communicated by a particular subscription associated with a subscriber.

The drift detection system 100 can be implemented in various manners. For example, in one embodiment, the drift detection system 100 can be a client application, or portion thereof, that interacts with a database management system or database server. In one instance, drift detection can be performed in the background without interrupting main application flow or compromising user experience while also not requiring support from the database server other than permitting access thereto. In another non-limiting example, the drift detection system 100 can be embodied as a web service or middle-tier application. This could help manage load on a database server as well as address particular security concerns, if only select client machines (subscribers) are allowed to access selected structural information.

The drift detection system 100 is generic and can operate over a plurality of domains including XML documents and databases and even various different implementations of databases. As a result, the drift detection system 100 can provide a common, or standard, way of detecting and communicating changes. Furthermore, specific embodiments can be lightweight and execute expeditiously. More specifically, the drift detection system 100 can be lightweight since no requirements are made of the data management systems that affect performance and scalability. Further, solely information needed to communicate drift conditions can be maintained. Further yet, simply comparing checksums, timestamps, or other values can result in fast execution.

Figure 4A:
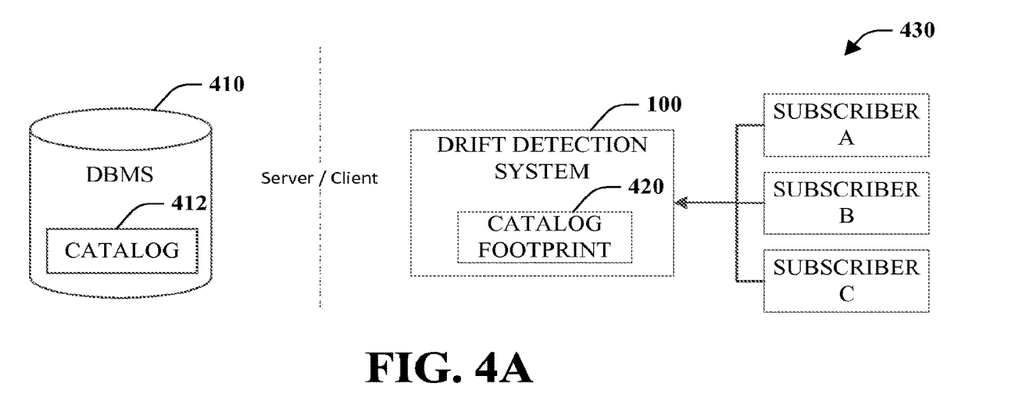
FIGS. 4A-C are block diagrams depicting an exemplary drift detection process.
Figure 4B:
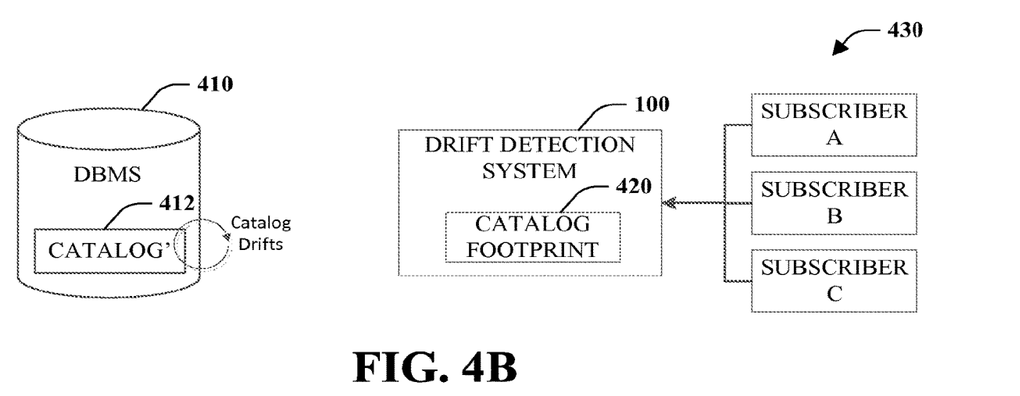
Figure 4C:
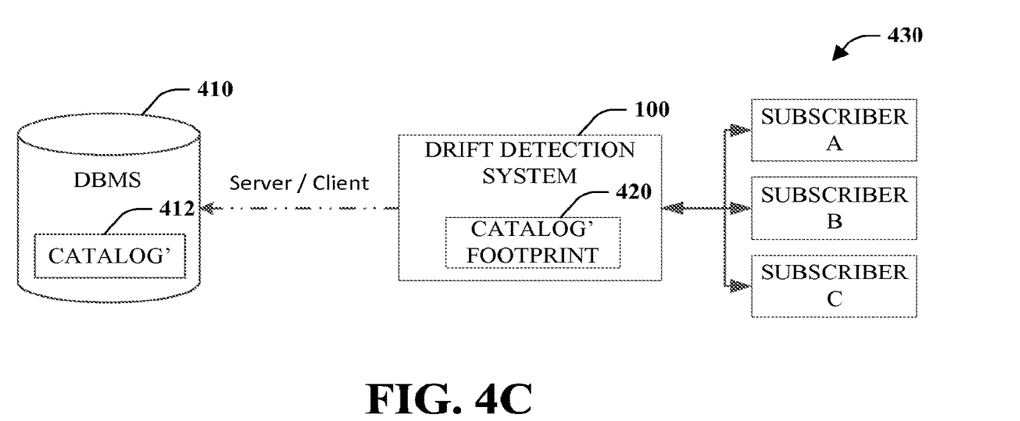

FIGS. 4A-C depict an exemplary drift detection process with respect to databases and database management systems. Turning first to FIG. 4A, a database management system 410 is shown on a server side of a two-tier architecture including a system catalog 412. The system catalog 412 stores a database definition in terms of metadata. More specifically, the metadata defines structure for database objects such as tables, views, functions, procedures, and other system objects. The metadata can also include reference data (e.g., zip codes, states, countries . . . ) that is stored in tables but is logically part of the database definition.

On the client-side of the two-tier architecture is the drift detection system 100. Three subscribers 430 subscribe to the drift detection system 100. Upon registration, the drift detection system 100 queries the database management system 410 for a set of information that captures the state of the database. Here, the drift detection system 100 saves a catalog footprint 420 that captures structure of the database. The drift detection system 100 can next establish a configurable cadence on which the database management system 410 is polled to detect drift conditions. The polling frequency can be configured by a subscriber. Additionally, a subscriber can initiate a drift check request at any time, for example if needed between intervals. Regardless of whether the drift check invokes automatically at a periodic interval or on-demand by a particular subscriber, details of any detected drifts would notify subscribers as per their subscription.

FIG. 4B illustrates the system catalog 412 drifting, noted as "Catalog" and the circular arrow associated therewith. For example, table columns could have been created, altered, renamed, or dropped. Alternatively, a table, view, or stored procedure could have been newly added, altered, or deleted. In any event, the state of database structure was changed.

FIG. 4C shows polling by the drift detection system 100 and identification of drift. Here, based on checksums or timestamps, for example it can be determined that one or more database objects identified in "Catalog'" does not match with stored values of those objects in catalog footprint 420. Subsequent to identification of such drift, the catalog footprint 420 is updated to "Catalog'," to reflect the drift and enable subsequent drift detection. The drift detection system 100 can also poll the database management system 410 for the next level of details regarding a drift such as the name and type of object and the nature of change. In one implementation, requests can be directed and batched together to optimize for memory, performance, and/or network bandwidth. Once the drift detection system 100 compiles details of drifts, it can notify the sub scribers 430.

This solution can significantly improve the performance and user experience of client scenarios. For example, consider a visual tree control showing a list of database objects. Using the drift detection system 100, the visual controls can be automatically updated at regular intervals without requiring explicit action. Further, since the system is lightweight and can serve multiple subscribers, the interval can be set for client needs.

Note also that in an alternate embodiment, the system catalog 412 can be extensible. Database management systems 410 include the system catalog 412 at least portions of which can be queried. Conventionally, however, the system catalog 412 is not extensible. As a result, information about structure such as the checksum is stored external to the database management system 410. Where the system catalog 412 is extensible, information about structure can be stored next to the object. For example, another column, a user column, that sits in the system catalog 412 can be added, where this extra information such as checksum is stored. Storing structural information outside the system catalog 412 requires management of the lifetime of information. If a table is deleted, the checksum needs to be identified and removed. Similarly, if a new object is created a new checksum, for example, should be added. Further yet, if backup of the system catalog 412 is made it will be unaware of checksum that reside outside the system catalog 412. These concerns can be addressed by adding such information to the system catalog 412. Additionally, the information can be stored in the actual database as opposed to in an extensible system catalog 412 or external to the database management system 410. This is another example of where knowledge of a database management system or the like can be exploited to optimize or improve the process of drift detection and notification.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the detection component 110 could utilize such mechanisms to infer when checks are made to optimize correspondence with a data source. The identification component 130 could also employ these mechanisms to infer nature of changes over time, such as that only particular changes are allowed by the data source (e.g., additions, modification . . . )

Figure 5:
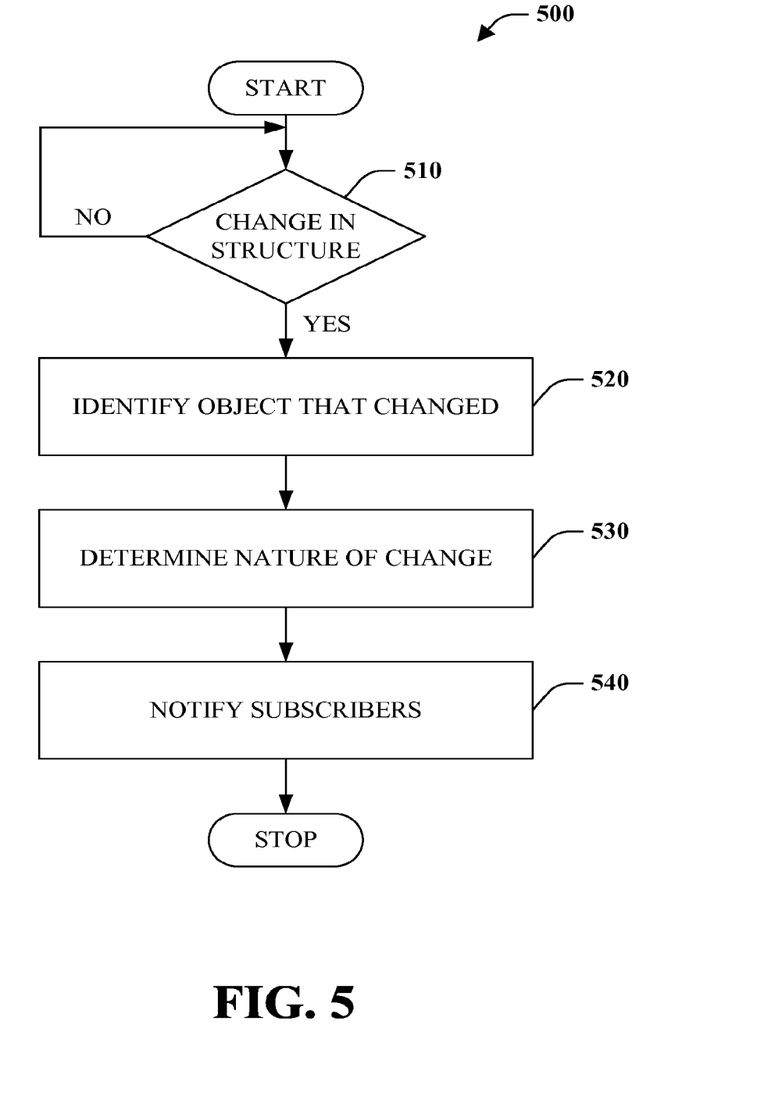
FIG. 5 is a flow chart diagram of a method of drift detection.

In view of the exemplary systems described supra, methodologies that may be implemented in accordance with the disclosed subject matter will be better appreciated with reference to the flow chart of FIG. 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 5, a method 500 of drift detection is illustrated. At reference numeral 510, a determination is made as to whether a change in data structure is detected. For example, a hash or timestamp associated with the data structure can be compared with a previous hash or timestamp, wherein a difference between current and previous values is indicative of a change in data structure, or in other words drift. If a change is not detected ("No"), the method loops back to 510 to check for a change in accordance with a specified interval, for instance. If a change is detected ("YES"), the method proceeds to numeral 520. Stated differently, the structure is automatically monitored for change. In one instance, a database definition state of a database server can be automatically monitored external to the database server by periodically polling the database server for a minimal set of information needed to capture the current state, which can be compared with the previous state to determine whether a change has occurred.

Once it is determined that there was a change to the structure, or in other words a drift, the actual portion of the structure or object that changed can be identified at numeral 520. For instance, the name and type of the object can be obtained. Consider an exemplary scenario where the structure includes a table with two columns: "C1" or type integer and "C2" of type string. Assuming a change occurred with respect to the first column, "C1" and integer can be returned. In other scenarios, a stored procedure or a view may be changed such that the name of the stored procedure or view can be returned as well as an indication that the name is that of a stored procedure or view.

At reference numeral 530, the nature of the change to the identified object is determined (e.g., addition, alteration, removal . . . ) as a function of current and previous states of the object. In one embodiment, the data structure can be queried to obtain the identified object. A comparison can then be made between the current object state and a previous object state to identify the difference. For example, the nature of change can correspond to addition of a column, deletion of a column or renaming a column in a table, among other things.

At numeral 540, subscribers, such as client applications, are notified of the occurrence of a change, the identity of the object that changed, and/or the nature of the change based on their subscription. A client application that is either less privileged with respect to its subscription or non-resilient to change need only be informed that a change occurred. Resilient client applications may be capable of dealing with more detailed information including the identity of the changed object and/or the nature of the change to the changed object. Various subscriptions can be made available to enable a client application to subscribe to supported and desired information regarding change or drift. Further, the method 500 can be optimized as a function of subscriptions. For instance, if there are only subscriptions that require notification of the occurrence of a change, additional detail regarding the identity of the changed object and the nature of the change need not be acquired. In another instance, if all subscribers need change details, the details can be fetched in the same batch or concurrently.

The above systems and methods describe detecting and notifying subscribers of a drift pertaining to the structure of a data source. Additionally, drift detection and notification can be employed with respect to anything that can be utilized as structure such as reference data. However, aspects of drift detection and notification herein are not limited to structure. In fact, aspects can also be applied with respect to data held within structure even if such data is not reference data. Conventional data change functionality, if provided at all, forms part of a management system, and affects the performance of a corresponding database. Aspects of drift detection provide a more lightweight approach.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used this description and appended claims in is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
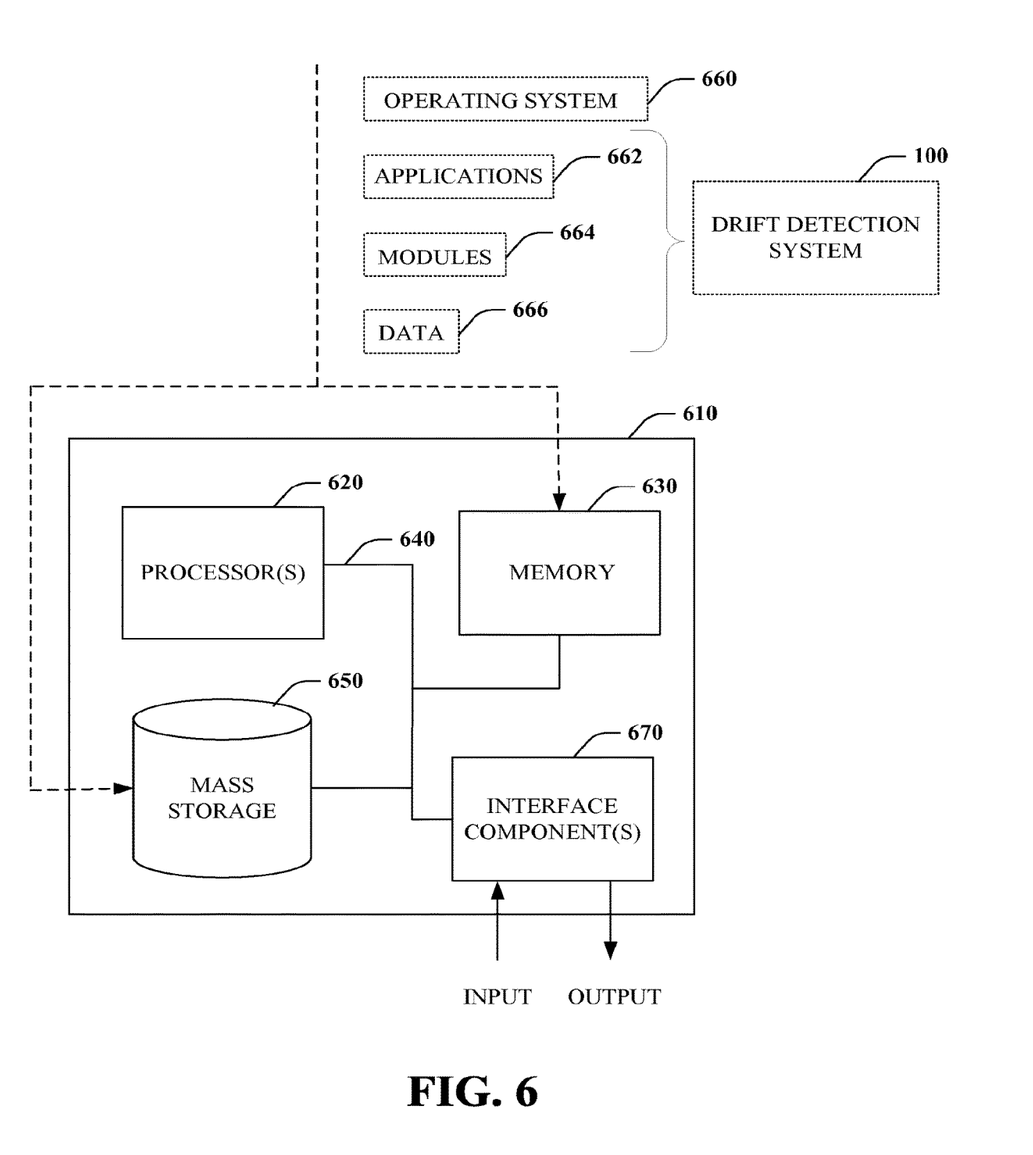
FIG. 6 is a schematic block diagram illustrating a suitable operating environment for aspects of the subject disclosure.

In order to provide a context for the claimed subject matter, FIG. 6 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 6, illustrated is an example general-purpose computer 610 or computing device (e.g., desktop, laptop, tablet, server, hand-held, programmable consumer or industrial electronics, set-top box, game system . . . ). The computer 610 includes one or more processor(s) 620, memory 630, system bus 640, mass storage 650, and one or more interface components 670. The system bus 640 communicatively couples at least the above system components. However, it is to be appreciated that in its simplest form the computer 610 can include one or more processors 620 coupled to memory 630 that execute various computer executable actions, instructions, and or components stored in memory 630.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration.

The computer 610 can include or otherwise interact with a variety of computer-readable media to facilitate control of the computer 610 to implement one or more aspects of the claimed subject matter. The computer-readable media can be any available media that can be accessed by the computer 610 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums which can be used to store the desired information and which can be accessed by the computer 610. Furthermore, computer storage media excludes signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 630 and mass storage 650 are examples of computer-readable storage media. Depending on the exact configuration and type of computing device, memory 630 may be volatile (e.g., RAM), non-volatile (e.g., ROM, flash memory . . . ) or some combination of the two. By way of example, the basic input/output system (BIOS), including basic routines to transfer information between elements within the computer 610, such as during start-up, can be stored in nonvolatile memory, while volatile memory can act as external cache memory to facilitate processing by the processor(s) 620, among other things.

Mass storage 650 includes removable/non-removable, volatile/non-volatile computer storage media for storage of large amounts of data relative to the memory 630. For example, mass storage 650 includes, but is not limited to, one or more devices such as a magnetic or optical disk drive, floppy disk drive, flash memory, solid-state drive, or memory stick.

Memory 630 and mass storage 650 can include, or have stored therein, operating system 660, one or more applications 662, one or more program modules 664, and data 666. The operating system 660 acts to control and allocate resources of the computer 610. Applications 662 include one or both of system and application software and can exploit management of resources by the operating system 660 through program modules 664 and data 666 stored in memory 630 and/or mass storage 650 to perform one or more actions. Accordingly, applications 662 can turn a general-purpose computer 610 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the drift detection system 100, or portions thereof, can be, or form part, of an application 662, and include one or more modules 664 and data 666 stored in memory and/or mass storage 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the drift detection system 100 and/or associated functionality can be embedded within hardware in a SOC architecture.

The computer 610 also includes one or more interface components 670 that are communicatively coupled to the system bus 640 and facilitate interaction with the computer 610. By way of example, the interface component 670 can be a port (e.g., serial, parallel, PCMCIA, USB, Fire Wire . . . ) or an interface card (e.g., sound, video . . . ) or the like. In one example implementation, the interface component 670 can be embodied as a user input/output interface to enable a user to enter commands and information into the computer 610, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 670 can be embodied as an output peripheral interface to supply output to displays (e.g., CRT, LCD, plasma . . . ), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A computing system comprising:
  one or more processors; and
  one or more computer-readable hardware storage media having stored thereon computer-executable instructions that are executable by the one or more processors to cause the computing system to:
    identify one or more subscribers that are configured to acquire data from a database on a server;
    receive particular data that is indicative of a database structure of the database, wherein the computing system uses machine learning to infer when checks are made on the database to determine when the computing system corresponds with the database to receive the particular data, wherein a type of the machine learning is selected from the group consisting of an expert system type, a fuzzy logic type, and a data fusion engine type;
    determine that one or more changes have been made to the database structure based at least in part on the particular data, wherein the particular data is changed relative to previous data indicative of the database structure that was received at a prior time; and notify the one or more subscribers after determining that the one or more changes have been made, wherein the one or more subscribers include a first application that is subscribed to receive information corresponding to the one or more changes according to a first level of granularity and a second application that is subscribed to receive the information corresponding to the one or more changes according to a second level of granularity, such that the notifying includes sending a first notice of the one or more changes with a first set of change information to the first application and a second notice of the one or more changes with a second set of change information to the second application, and wherein the first level of granularity is determined based on a first identified subscription type and the second level of granularity is determined based on a second identified subscription type whereby information that is included within the first notice and that corresponds to the first level of granularity is different than information that is included within the second notice and that corresponds to the second level of granularity.

2. The computing system of claim 1, wherein multiple requests for data regarding the one or more changes are batched together to form a batch request.

3. The computing system of claim 1, wherein the computing system provides a notification to notify the one or more subscribers, and wherein execution of the computer-executable instructions further causes the computing system to:

configure the notification to include information describing a change to a name and a change to a type of an object of the database structure.

4. The computing system of claim 1, wherein the computing system provides a notification to notify the one or more subscribers, and wherein execution of the computer-executable instructions further causes the computing system to:

configure the notification to include information describing a nature of change to an object of the database structure.

5. The computing system of claim 1, wherein the first notice omits at least the name or type of object information and wherein the second notice includes the name or type of object information that is omitted from the first notice based on a subscription level of the first application or the second application.

6. The computing system of claim 1, wherein the computing system is a distributed computing system.

7. The computing system of claim 1, wherein execution of the computer-executable instructions further causes the computing system to:

query the database at a predetermined interval for a value that indicates a current state of the database structure, the value that indicates the current state of the database structure comprising at least one of (i) a new timestamp of an additional modification made to the database structure or (ii) a new checksum of the database structure after the additional modification;

compare the value that indicates the current state of the database structure with a stored value that represents a previous state of the database structure;

upon detecting a difference between the value that indicates the current state of the database structure and the stored value that represents the previous state of the database structure, request additional data from the database, the requested additional data comprising at least one of a name or a type of object information associated with the database structure; and provide the additional data to one or more software applications.

8. A computer-implemented method comprising:

a computing system identifying one or more subscribers that are configured to acquire data from a database on a server;

the computing system receiving particular data that is indicative of a database structure of the database, wherein the computing system uses machine learning to infer when checks are made on the database to determine when the computing system corresponds with the database to receive the particular data, wherein a type of the machine learning is selected from the group consisting of an expert system type, a fuzzy logic type, and a data fusion engine type;

the computing system determining that one or more changes have been made to the database structure based at least in part on the particular data, wherein the particular data is changed relative to previous data indicative of the database structure that was received at a prior time; and the computing system notifying the one or more subscribers after determining that the one or more changes have been made, wherein the one or more subscribers include a first application that is subscribed to receive information corresponding to the one or more changes according to a first level of granularity and a second application that is subscribed to receive the information corresponding to the one or more changes according to a second level of granularity, such that the notifying includes sending a first notice of the one or more changes with a first set of change information to the first application and a second notice of the one or more changes with a second set of change information to the second application, and wherein the first level of granularity is determined based on a first identified subscription type and the second level of granularity is determined based on a second identified subscription type whereby information that is included within the first notice and that corresponds to the first level of granularity is different than information that is included within the second notice and that corresponds to the second level of granularity.

9. The method of claim 8, wherein the one or more subscribers comprise one or more software applications.

10. The method of claim 8, wherein determining that the one or more changes have been made to the database structure is at least partially based on a function of a timestamp associated with the database structure.

11. The method of claim 9, wherein determining that the one or more changes have been made to the database structure includes use of a function of a checksum associated with the database structure.

12. The method of claim 9, wherein determining whether the database structure has changed is performed as part of a background process.

13. The method of claim 9, wherein the database structure is a table, and wherein the one or more changes comprises a detectable drift condition that includes the table being modified.

14. The method of claim 9, wherein the method further includes:
   the computing system polling the database and then receiving the particular data from the database.

\* \* \* \* \*